(12) United States Patent
Frank

(10) Patent No.: US 8,033,765 B2
(45) Date of Patent: Oct. 11, 2011

(54) DRILLING TOOL

(75) Inventor: Peter Frank, Floh-Seligenthal (DE)

(73) Assignee: Sandvik Intellectual Property AB, Sandviken (SE)

(*) Notice: Subject to any disclaimer, the term of this patent is extended or adjusted under 35 U.S.C. 154(b) by 1248 days.

(21) Appl. No.: 10/551,996

(22) PCT Filed: Mar. 5, 2004

(86) PCT No.: PCT/EP2004/002256
§ 371 (c)(1),
(2), (4) Date: Oct. 11, 2006

(87) PCT Pub. No.: WO2004/087354
PCT Pub. Date: Oct. 14, 2004

(65) Prior Publication Data
US 2007/0036621 A1    Feb. 15, 2007

(30) Foreign Application Priority Data
Apr. 4, 2003   (DE) .................................. 103 15 394

(51) Int. Cl.
*B23B 29/03* (2006.01)
(52) U.S. Cl. .................. 408/181; 408/153; 408/185
(58) Field of Classification Search .................. 408/153, 408/181–185
See application file for complete search history.

(56) References Cited

U.S. PATENT DOCUMENTS

| | | | |
|---|---|---|---|
| 2,204,855 A | | 6/1940 | Healy |
| 3,433,104 A | * | 3/1969 | Milewski et al. ............. 408/156 |
| 3,521,507 A | * | 7/1970 | Yogus et al. .................. 408/199 |
| 3,704,958 A | * | 12/1972 | Gulibon et al. ............... 408/153 |
| 3,856,428 A | * | 12/1974 | Eversole ....................... 408/240 |
| 4,101,239 A | * | 7/1978 | Wohlhaupter ................ 408/182 |
| 4,231,691 A | * | 11/1980 | Pape et al. .................... 408/185 |
| 4,464,088 A | * | 8/1984 | Dehn ............................ 408/182 |
| 4,500,233 A | * | 2/1985 | Dehn ............................ 408/182 |
| 5,275,517 A | * | 1/1994 | Turnipseed et al. ......... 409/184 |
| 5,330,297 A | * | 7/1994 | Engstrand .................... 408/153 |
| 5,716,169 A | * | 2/1998 | Schuerfeld ................... 408/1 R |
| 6,183,174 B1 | * | 2/2001 | Kaiser et al. ................. 408/185 |

FOREIGN PATENT DOCUMENTS

| | | |
|---|---|---|
| DE | 2746232 | 4/1979 |
| EP | 0175011 A1 | 3/1986 |
| EP | 0344616 A1 | 12/1989 |
| EP | 0564425 A1 | 10/1993 |

* cited by examiner

*Primary Examiner* — Daniel Howell
(74) *Attorney, Agent, or Firm* — Drinker Biddle & Reath LLP

(57) ABSTRACT

The invention relates to a base body for a drilling tool, in particular to drilling/grinding tool whose front surface (14) can accommodate a cutting insert holder (2). Said invention also relates to a cutting insert holder used with said base body (1) provided with a seat for receiving a cutting insert (13, 13', 13"). The aim of the invention is to develop a flexibly usable drilling tool whose cutting insert holder can be adjusted in a simple and accurate manner and is not expensive. For this purpose, at least one adjusting pin (4) which is connected to the base body (1) axially overlaps the cutting insert holder (2) and/or the cutting insert in such a way that a radial adjustment of the cutting insert holder (2) with respect to the base body (1) can be carried out by measuring the radial deviation (a) between the defined point of the cutting insert holder (2) or a cutting insert (3, 3', 3") accommodated thereby and the adjusting pin (4). In addition, a bearing surface (19) for supporting the cutting insert holder (2) on the front surface (14) of the base body (1) of the drilling tool is provided with a projection (17), preferably longitudinal, which extends outside the bearing surface (19) and is embeddable into a groove (15) on the front surface (14).

26 Claims, 10 Drawing Sheets

SECTION A-A

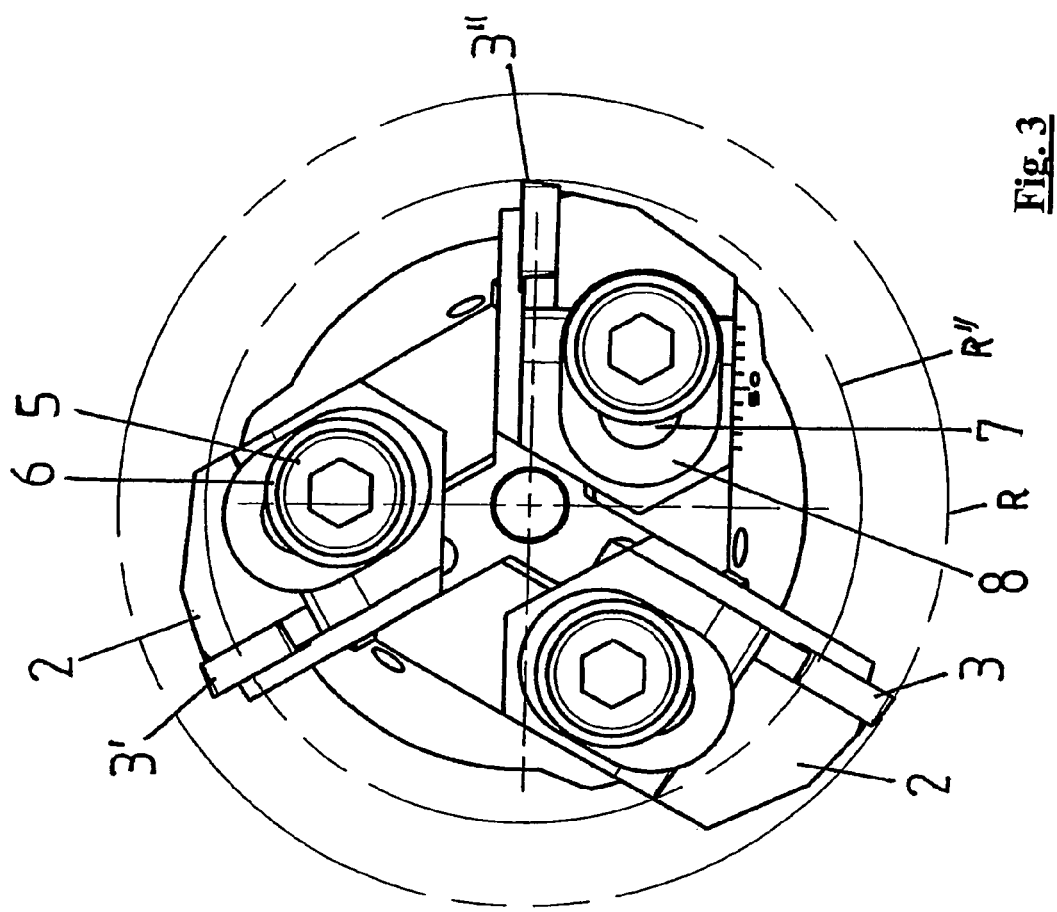
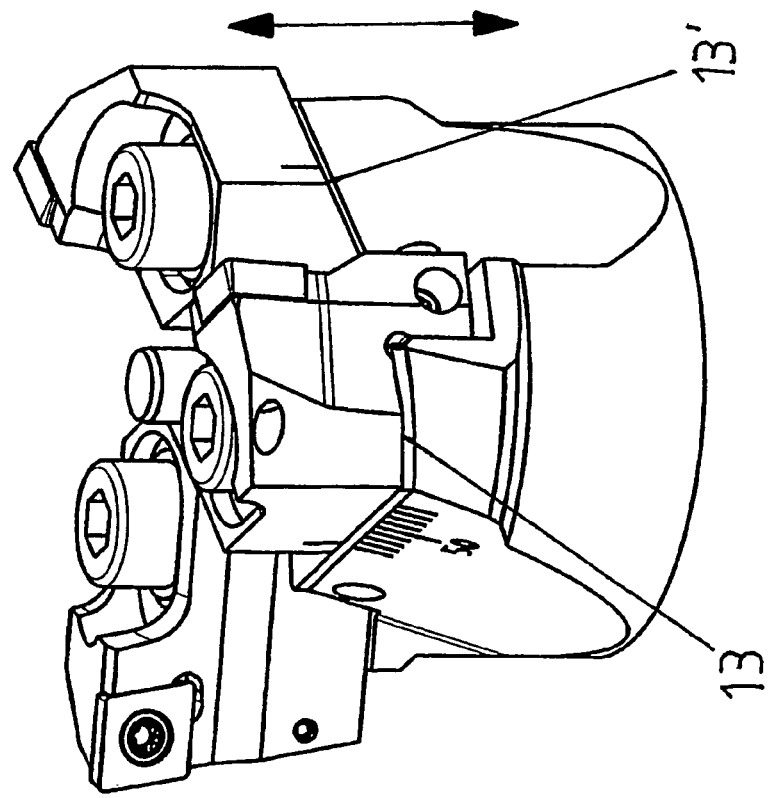

SECTION A-A

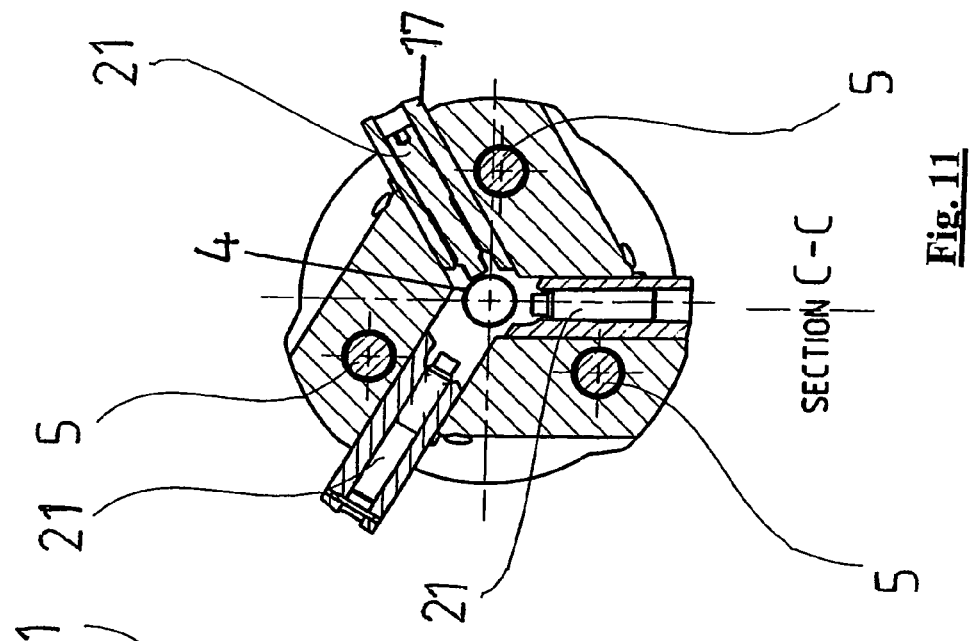
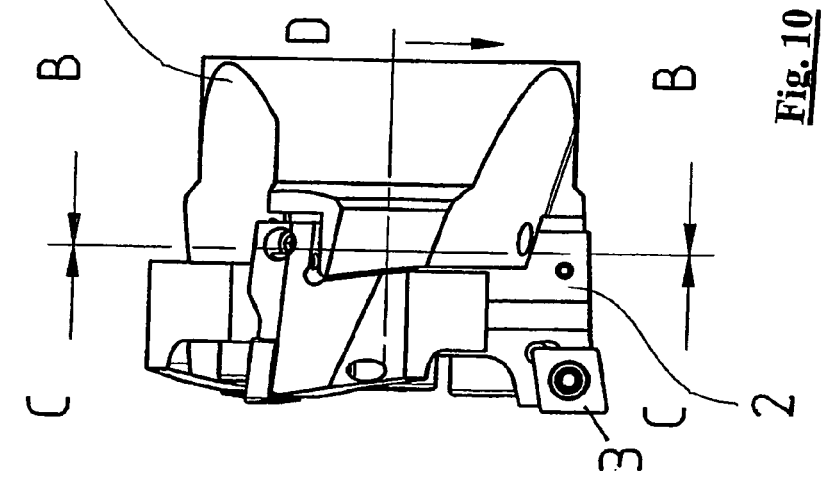
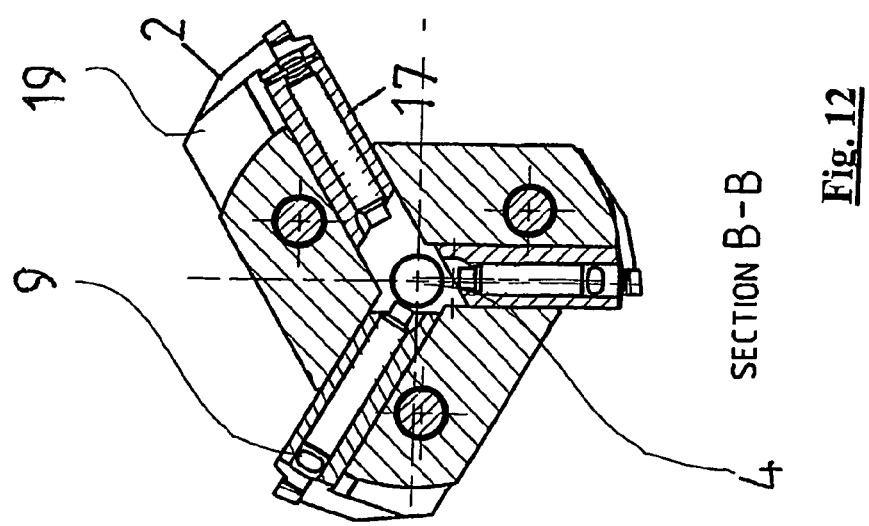

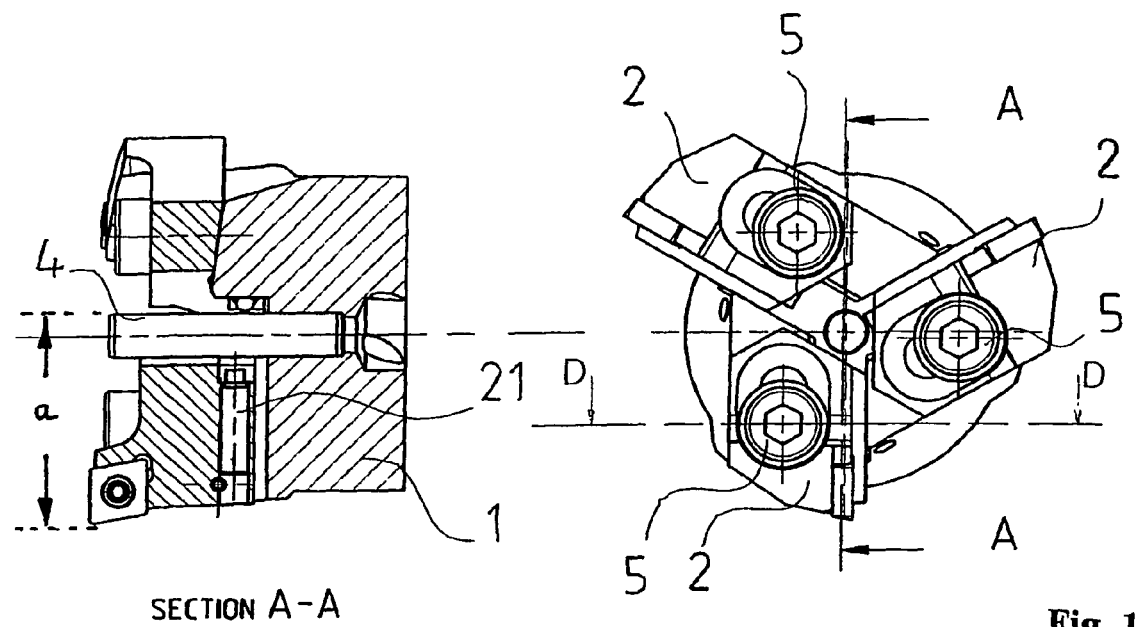
SECTION A-A
Fig. 14
Fig. 13
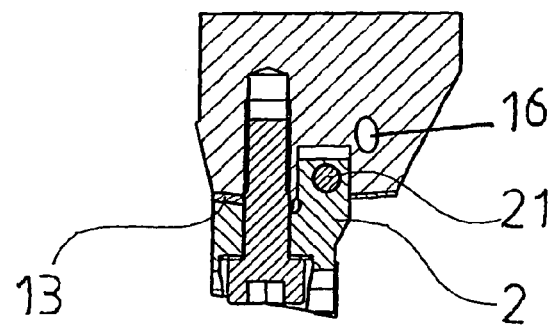
SECTION D-D
Fig. 15

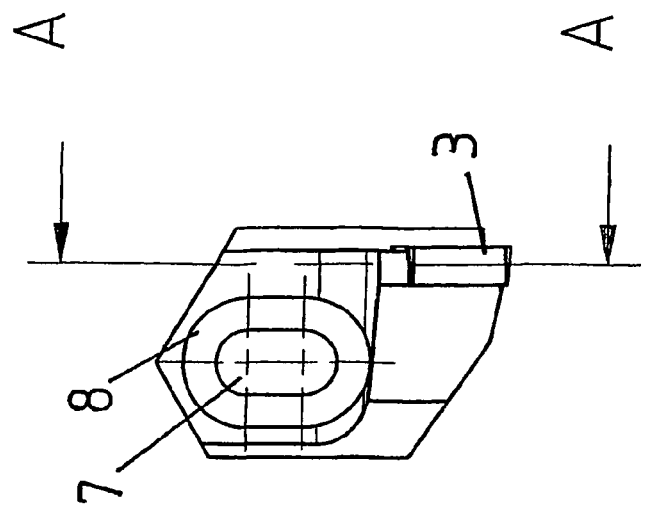
*Fig. 20*
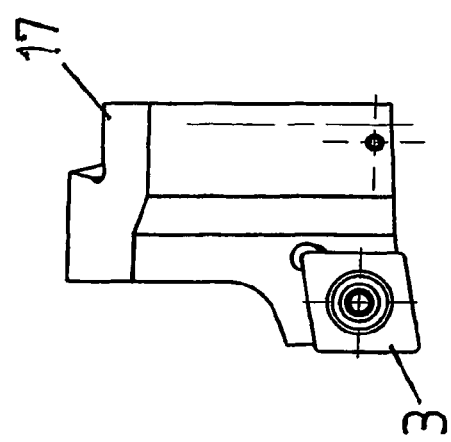
*Fig. 19*
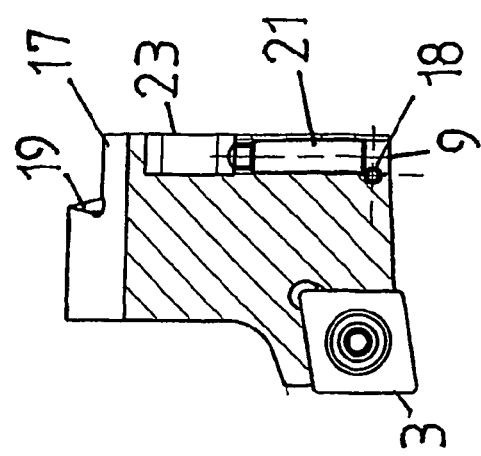
SECTION A-A   *Fig. 21*

DRILLING TOOL

The present invention relates to a drilling tool, in particular to a drilling/grinding tool with a base body whose front surface can accommodate at least one cutting insert holder. A tool of this kind serves to expand a pre-drilled hole for example.

During the cutting operation the tool rotates about a central axis, which is aligned perpendicularly to the front surface. When the tool is inserted into a pre-drilled hole the cutting inserts accommodated ed on the cutting insert holders engage with the internal contour of the hole, expand this and if necessary carry out the final machining of the inside surfaces.

A drilling tool of this kind is known from EP 0 564 425 for example. There a boring head with a rod-shaped base body is shown, at a free end of which two holders for cutting inserts are provided, which holders project in radially opposite directions over the circumferential surface of the rod-shaped base body and are each adjustable in different radial positions by displacement along a groove. This known drilling tool however has the disadvantage that it is only adjustable with great effort, generally using a pre-adjusting device. Furthermore the fine radial adjustment of the cutting insert holders is very time-consuming.

The object of the present invention is therefore to provide a drilling tool, which can be used flexibly, the cutting insert holder of which can be adjusted in a simple and accurate manner and can be manufactured economically.

According to the invention this object is achieved in that at least one adjusting pin connected to the base body axially overlaps the cutting insert holder and/or the cutting insert, in such a way that the radial adjustment of the cutting insert holder with respect to the base body can be carried out by measuring the radial deviation between a defined point of the cutting insert holder or a defined point on the cutting insert accommodated on the cutting insert holder and the adjusting pin.

With known drilling tools in general there is no possibility of measuring the relative radial displacement of the cutting insert with respect to the base body by mechanical means in order to permit fine adjustment of the cutting inserts on the base body, without removing the base body from the machine. Indeed it is possible in principle with drilling tools, which carry an even number of cutting insert holders, so that each cutting insert encounters a diametrically facing cutting insert, to determine the diameter by measuring the radial distance between two facing cutting edges. Apart from the fact that this adjustment procedure requires each cutting insert to be associated with a diametrically facing cutting insert, the procedure however only offers the possibility of adjusting two cutting inserts with respect to one another, not however with respect to the base body. For adjusting the cutting inserts on the base body therefore generally the base body must be separated from the drive and mounted in a so-called pre-adjusting device, so that adjustment can take place by way of measurements obtained using optical methods.

By providing the adjusting pin according to the invention, which in principle can take any form, a defined measurement point firmly connected to the base body is made available, so that with the aid of a caliper gauge the distance between the cutting insert and the adjusting pin can be measured for example and thus the position of the cutting insert with respect to the adjusting pin and thus with respect to the base body can be checked.

Advantageously the adjusting pin projects at least so far over the front surface of the base body that it overlaps the upper surface of the cutting insert holder. This arrangement ensures easier access to the adjusting pin, in order to permit rapid gauging and setting-up of the tool. However the adjusting pin should not project axially over the cutting insert mounted on the cutting insert holder, since otherwise for example it would not be possible to drill a blind hole.

In an advantageous embodiment an individual adjusting pin is provided for each cutting insert holder.

However it has been shown, in particular with drilling tools having a small drilling diameter that the adjusting pin is advantageously aligned with the axis of rotation of the drilling tool, that is to say in the centre of the tool. This has the advantage that it is generally possible to mechanically measure the position of each cutting insert holder and/or each cutting insert to access the same adjusting pin so that costly production and fixing of a number of adjusting pins are unnecessary.

In principle the adjusting pin can take any form. In practice a cylindrical form has proven satisfactory. Alternatively however the adjusting pin can also have an N-angular form, where N is the number of cutting insert holders which can be retained on the base body. It has the advantage, for measuring the radial distance between adjusting pin and cutting insert, that a corresponding bearing surface is provided on the adjusting pin, so as to accelerate the measurement procedure.

The adjusting pin is of special advantage if an odd number of cutting insert holders is accommodated on the base body, since then no diametrically facing cutting insert is associated with the individual cutting inserts on the cutting insert holders and it is not possible to check the adjustment by measuring the distance between two diametrically facing cutting inserts.

In a particularly preferred embodiment the front surface has at least one groove running in the radial direction which is intended to accommodate a preferably longitudinal projection of the cutting insert holder corresponding to the shape of the groove. It has been shown that this arrangement permits accurate radial adjustment of the cutting insert holder with respect to the base body, misalignment in the circumferential direction being generally minimized at the same time. Added to which the groove connection can be manufactured economically.

Particularly preferred is for the groove to have an essentially U-shaped cross section, wherein the U-bottom preferably forms a right angle with the U-leg.

The individual grooves preferably extend as far as the centre, so that the adjusting pin aligned in the centre at the same time can serve as a stop and/or counter face for a fine adjusting screw located in the longitudinal projection of a cutting insert holder.

This dual function of the adjusting pin according to the invention thus permits not only extremely accurate fine adjustment, but furthermore also provides the possibility of checking the adjustment in a simple manner.

Particularly in the case of drilling tools with a large hole diameter however it has been shown that simultaneous use of the centrally aligned adjusting pin as a counter bearing and/or stop is cumbersome for a corresponding fine adjusting screw, since it may be that the fine adjusting screw has to be implemented very long and a corresponding number of turns of the fine adjusting screw are needed, before this engages with the centrally aligned adjusting pin and fine adjustment can be carried out.

Therefore it is proposed in a further particularly preferred embodiment that the groove bottom comprises at least one projection preferably in the form of a stud, which is intended to reach into a recess of the cutting insert holder in order to limit the radial adjustability of the cutting insert holder. Furthermore this has the advantage, in particular if the tool is mounted in a horizontal position, that the cutting insert holder can be retained on the base body and remains there, even if additional attachment devices have not yet been fitted. Owing to the fact that the projection reaches into a preferably oblong recess of the cutting insert holder, although on the one hand a certain radial adjustability of the cutting insert holder with respect to the base body becomes possible, on the other hand this is limited in such a manner that the cutting insert holder is effectively prevented from inadvertently sliding out along the groove outwards.

In a further particularly preferred embodiment it is proposed that a device for attaching a cutting insert holder on the front surface is provided with variable retaining force. Thus for example it is possible firstly to temporarily fix the cutting insert holder on the base body with a retaining force varied accordingly. As a result inadvertent sliding of the cutting insert holder on the base body, which can occur in particular with overhead mounting of the cutting insert holder on the base body, can be prevented. The variable retaining force can however be overcome by exerting a corresponding adjusting force so that, for the purpose of finely adjusting the cutting insert holder on the base body, radial movement of the cutting insert holder on the base body is nevertheless provided. After fine adjustment is completed, the cutting insert holder can be finally fixed on the base body.

The device for holding a cutting insert holder preferably consists of a screw, which is intended to reach through a bore formed as a slotted hole in the cutting insert holder and of a spring, preferably a disk spring. Because the screw reaches through the bore formed as a slotted hole, radial movement of the cutting insert holder on the base body is possible, without the risk of inadvertently losing the cutting insert holder. With the help of the spring and/or the disk spring, which by means of the screw exerts force on the cutting insert holder, the retaining force can be varied accordingly. In a first step therefore the cutting insert holder is fixed by means of the screw and the disk spring with a certain retaining force, then fine-adjusted accordingly and finally the screw is fully tightened so that even during the cutting operation relative shifting of the cutting insert holder on the base body is impossible.

It goes without saying that the device with variable retaining force can be used advantageously in the case of the known drilling tools with a base body whose front surface can accommodate at least one cutting insert holder. The device with variable retaining force is therefore not tied to the presence of an adjusting pin, but can be used advantageously for attaching all kinds of cutting insert holders on base bodies or also for fixing cutting inserts on cutting insert holders.

In a further particularly preferred embodiment the drilling tool has a device for axially adjusting the cutting insert holder. Especially with the use of several cutting insert holders it is advantageous in some applications if the individual cutting inserts, attached on the cutting insert holder, are offset to one another in the axial direction.

Advantageously the device for axially adjusting the cutting insert holder consists of shims, which are intended to be arranged between cutting insert holder and front surface of the base body. By suitably selecting the thickness of the shim the cutting insert holder can be axially adjusted with respect to the base body. This embodiment is particularly advantageous in combination with the substantially U-shaped groove provided on the base body into which a projection, whose cross section is preferably adapted to the inner surface of the groove, reaches, since though by providing shims the projection penetrates the groove less deeply, corresponding guidance is maintained nevertheless, so that essentially the holder can only be moved in the radial direction.

Advantageously a device for the radial adjustment of the cutting insert holder is provided for each cutting insert holder. With some applications it can be advantageous if each cutting insert holder can be adjusted separately in the radial direction.

Furthermore the present invention relates to a cutting insert holder for use with a drilling tool of the kind described initially with a seat for receiving a cutting insert, the cutting insert holder having a bearing surface for supporting the cutting insert holder on the front surface of a base body of a drilling tool as well as a preferably longitudinal projection overlapping the bearing surface for reaching into a groove provided on the front surface.

In a particularly practical embodiment the cutting insert holder has a device for radially adjusting the cutting insert holder with respect to the base body.

This device advantageously can consist of a screw, which is intended to abut against a stop element firmly connected to the base body. Thus very accurate radial adjustment of the cutting insert holder with respect to the base body is possible.

In a functional embodiment the adjusting screw in the longitudinal direction runs through at least one part of the projection. Since the projection reaches into the groove of the base body running in the radial direction, this arrangement ensures that the adjusting screw is also orientated in the radial direction, as a result of which particularly effective and precise transmission of force from the screw onto the stop element is possible.

In an alternative embodiment the longitudinal projection has a preferably oblong recess, which is arranged in such a manner that a projection located on the groove bottom of the front surface of the drilling tool reaches into the recess and as a result the radial adjustability of the cutting insert holder in the groove is limited at least to one direction.

Furthermore it is advantageous if the projection comprises a tapped hole, which in the longitudinal direction of the cutting insert holder opens into the oblong recess. As a result it is possible by turning the adjusting screw for the tip of the screw to abut the projection reaching into the recess, so that the cutting insert holder can be effectively and accurately adjusted with respect to the base body.

In a further particularly expedient embodiment the cutting insert holder has a slotted hole for attaching the cutting insert holder on the base body by means of a screw extending through the slotted hole and engaging in a tapped hole on the base body.

Furthermore it is proposed in a particularly preferred embodiment that on the side facing away from the bearing surface a countersink is provided for seating a disk spring arranged between screw head and slotted hole.

Further advantages, features and possible applications will become clear on the basis of the following description of preferred embodiments as well as the associated drawings, wherein there is shown:

FIG. 1 a perspective view of a completely assembled drilling tool according to a first embodiment, FIG. 2 a perspective view of the completely assembled drilling tool, which demonstrates the axial adjustability of the cutting inserts, FIG. 3 a view from above onto the drilling tool of FIG. 1, which demonstrates the radial adjustability of the cutting inserts, FIG. 4 a view from above onto a base body, FIG. 5 a side view onto the base body of FIG. 4, FIG. 6 a cutaway view along line A-A of FIG. 4, FIG. 7 a view from above onto a cutting insert holder, FIG. 8 a side view onto the cutting insert holder of FIG. 7, FIG. 9 a cutaway view through the cutting insert holder of FIGS. 7 and 8, FIG. 10 a side view onto the base body of the first embodiment with cutting insert holders attached, FIG. 11 a cutaway view along line C-C of FIG. 10, FIG. 12 a cutaway view along line B-B of FIG. 10, FIG. 13 a view from above onto the drilling tool of the first embodiment, FIG. 14 a cutaway view along line A-A of FIG. 13, FIG. 15 a cutaway view along line D-D of FIG. 13, FIG. 16 a side view onto a base body of a second embodiment, FIG. 17 a view from above onto the base body of the second embodiment of FIG. 16, FIG. 18 a cutaway view along line A-A of FIG. 17, FIG. 19 a side view onto a cutting insert holder of a second embodiment, FIG. 20 a view from above onto the cutting insert holder of FIG. 19, FIG. 21 a cutaway view along line A-A of FIG. 20 and FIG. 22 a perspective view of a third embodiment.

Figure 1:
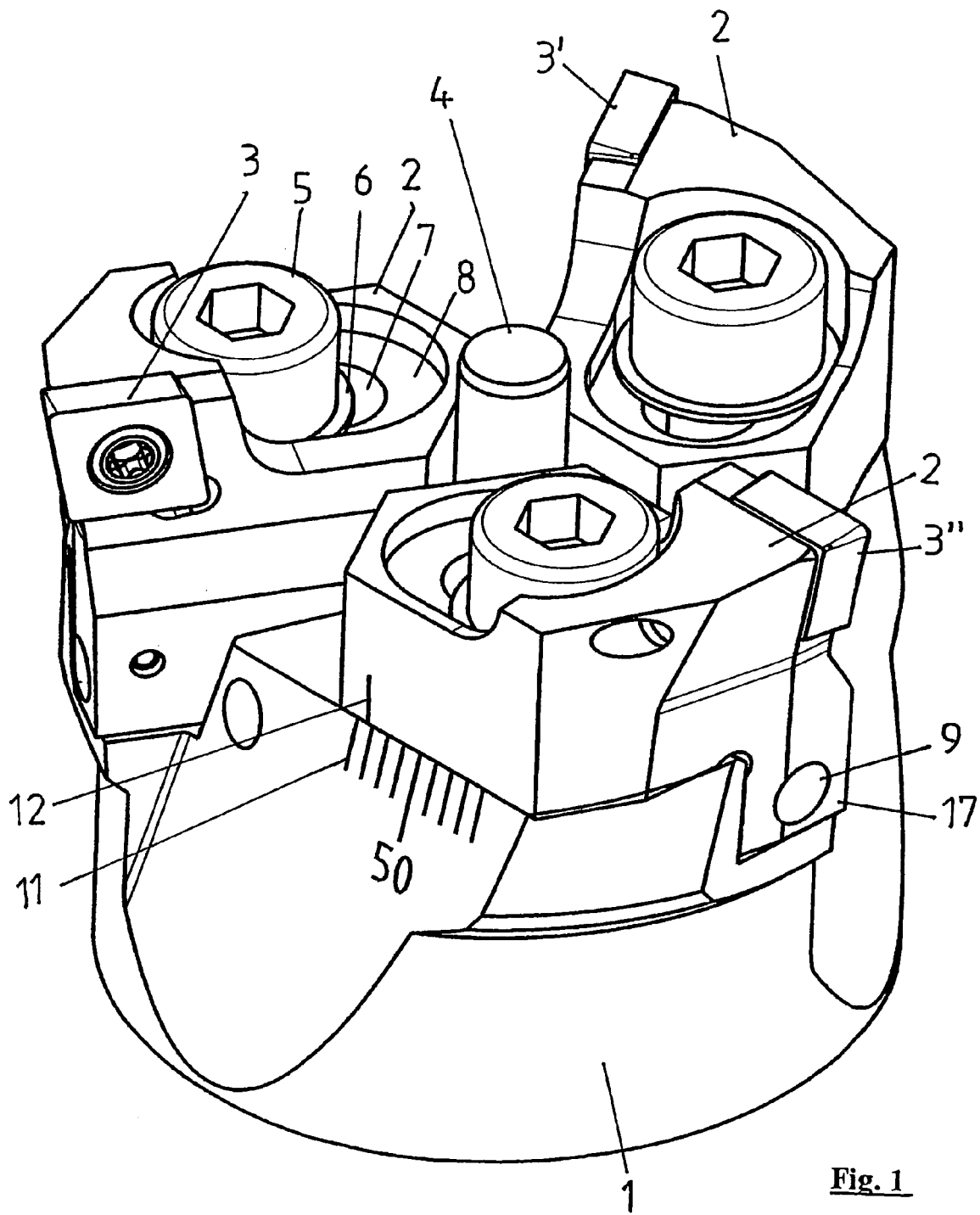
FIG. 1 shows a perspective view of a completely assembled drilling tool according to a first embodiment of the present invention.

The drilling tool has a base body 1, whose front surface 14 accommodates several cutting insert holders 2, which in each case support a cutting insert and/or a cutting insert 3, 3', 3". The cutting insert holders 2 are secured on the base body 1 with the aid of a screw 5, which reaches through a bore 7 in the cutting insert holder 2 on the front surface of the base body 1. Clearly seen in FIG. 1 is the adjusting pin 4, which overlaps the front surface of the base body 1 in such a manner that the cutting insert holders 2 can be radially adjusted with respect to the base body 1 by measuring the distance a between a defined point of the cutting insert holder 2 or a defined point on the cutting insert 3, 3', 3" and the adjusting pin 4 arranged on the cutting insert holder 2. This function is described in more detail below.

The individual cutting insert holders 2 with the cutting inserts 3, 3', 3" can each be adjusted separately both in the axial direction and in the radial direction.

FIG. 2 shows a perspective view of the drilling tool of FIG. 1, which demonstrates the axial adjustability of the cutting insert holders 2. It can be clearly seen that a shim 13, 13' is arranged between two of the three cutting insert holders 2 and the base body 1, so that the individual cutting insert holders 2 are axially offset to one another (illustrated by a double arrow). The two spacers and/or shims 13 and 13' have a different thickness. During the cutting operation the boring head rotates about its axis of rotation and is axially inserted into the work-piece, that is to say moved upwards in FIG. 2. As a result of the cutting inserts 3 being adjusted differently in the axial direction these engage in the work-piece at points with varying axial arrangement.

FIG. 3 shows a view from above onto the drilling tool of FIG. 1 and demonstrates the radial adjustability of the cutting insert holders 2 on the base body 1. It can be clearly seen that the cutting insert holders 2 can be positioned differently in the radial direction due to their bores 7 formed as slotted holes. Their exact positioning and adjustment are described further below. In FIG. 3 it can be seen that the cutting insert 3 is the most outwardly offset in the radial direction. The cutting radius of the cutting insert 3 has a size R. The cutting insert 3", which is illustrated in FIG. 3 pointing to the right, is the least outwardly offset in the radial direction, so that it describes a radius R". The third cutting insert 3' describes a drilling radius, which lies between R and R".

In the case of the adjustment shown the drilling tool functions strictly speaking not as a three edge drilling tool, but as a drilling tool with three single edge tools.

In this case the cutting insert holder, which is axially arranged most "ahead", is radially arranged most "inwards". Thus the cutting insert, which is axially arranged most ahead, that is to say with which the spacer 13, 13' with the greatest thickness is associated, first engages with the work-piece and bores an initial hole having the smallest radius R". Afterwards the other cutting inserts, which are accordingly axially set further rearwards, but radially offset further outwards, successively engage with the work-piece. Strictly speaking a step-boring operation is performed here, in which each cutting insert drills a hole by itself. As a result of this arrangement the cutting depth which can be achieved with the tool can be tripled (depending on the number of cuts), although the advance is reduced to a third.

To demonstrate the radial adjustability of the individual cutting insert holders 2 on the base body 1 the elements involved are shown in different views in FIGS. 4 to 9 and the interaction of the individual elements with one another is illustrated separately in FIGS. 10 to 15.

Figure 4:
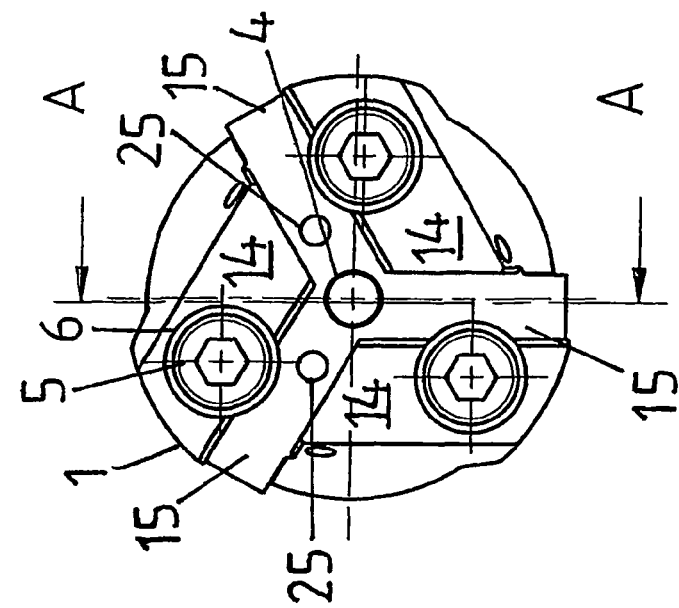

FIG. 4 shows a plan view onto the base body 1 of FIG. 1, the cutting insert holders 2 supporting the cutting inserts 3, 3', 3" having been removed here. To be seen is the front surface 14 of the base body 1, into which the locking screws 5, which are provided for securing the cutting insert holders 2 on the base body 1, are screwed. The front surface 14 has a set of grooves 15 extending in the radial direction. These grooves serve to accommodate corresponding projections 17, which are arranged on the cutting insert holders 2 so that the projection 17 of the cutting insert holder 2 can be radially adjusted within the groove 15. With the preferred embodiment shown three grooves, which are equidistant, that is to say enclose one another at an angle of 120° (=360° divided by the number of cuts) are illustrated. For some applications however it may be advantageous if the individual grooves and consequently the cuts are not located uniformly along the circumference of the tool. Especially with the symmetrical arrangement of the cuts, unwanted vibration can arise in some cases. Therefore tools with three grooves for example, which are each arranged at angles between 100 and 1300 to one another, have been used with success.

In the embodiment illustrated in the drawings the grooves 15 in the front surface 14 of the base body 1 extend in the radial direction outwards from the adjusting pin 4.

Figure 5:
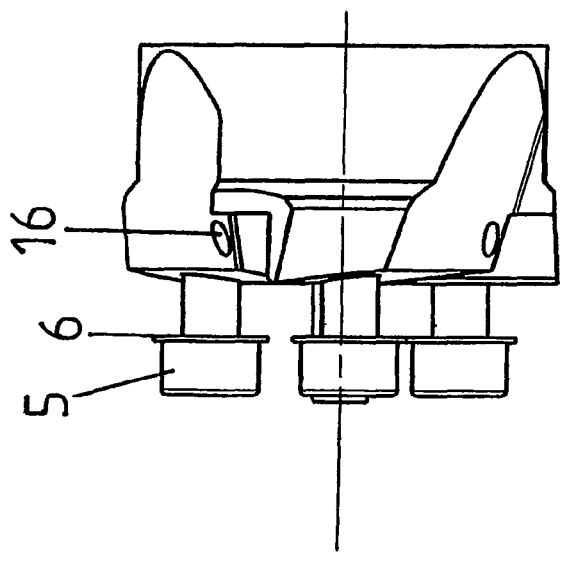

FIG. 5 shows a side view of the base body without cutting insert holders attached. It can be seen in the embodiment shown that each groove 15 is associated with a corresponding cooling agent outlet 16, so that with the cutting insert holder 2 attached cooling agent can be fed to the cutting insert 3 via the cooling agent supply pipe 16.

Figure 6:
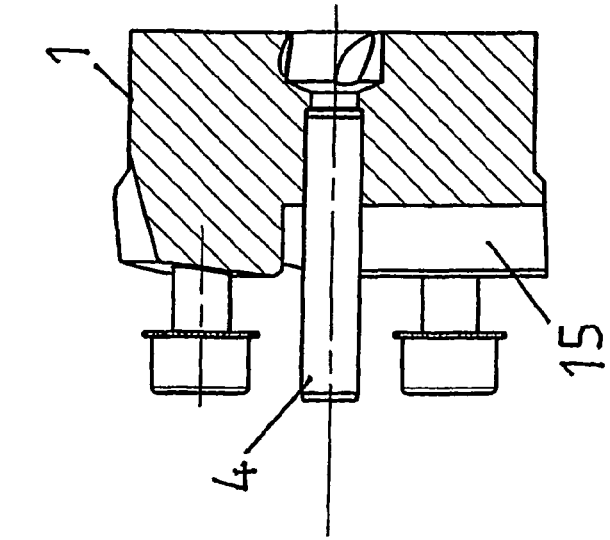

FIG. 6 shows a cutaway view along line A-A of FIG. 4. The groove 15, which has a substantially U-shaped cross section, extends up to the adjusting pin 4. Furthermore in FIGS. 4 to 6 disk springs 6 can be seen, which together with each of the screws 5 serve to secure the cutting insert holder 2 on the front surface 14 of the base body 1. The function of the disk springs 6 is described further below.

Figure 7:
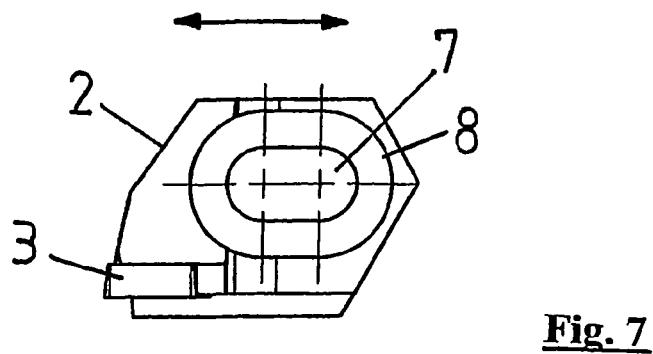

FIG. 7 shows a plan view onto a cutting insert holder 2. It can be seen that the cutting insert holder 2 accommodates a cutting insert 3 and has a bore 7 formed as a slotted hole, by means of which the cutting insert holders 2 can be secured on the base body 1.

Figure 8:
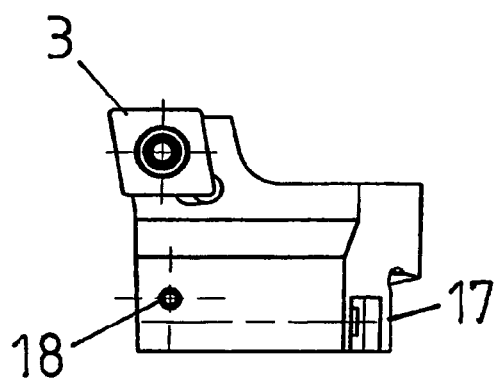

FIG. 8 shows a side view onto the cutting insert holder 2.

Figure 9:
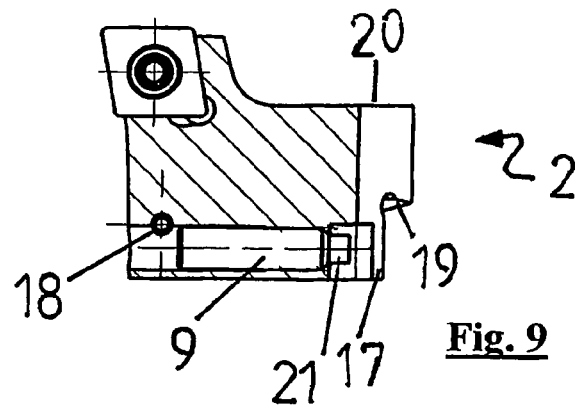

FIG. 9 shows a cutaway view of the corresponding cutting insert holder 2. The cutting insert holder 2 has an upper surface 20 and a lower bearing surface 19. A projection 17, which is formed in such a manner that its outer contour substantially matches the internal contour of the groove 15 of the base body 1 overlaps the lower support surface 19. If therefore in the case of the base body 1, which is shown in FIGS. 4 to 6, the locking screw 5 including disk spring 6 is removed, the cutting insert holder 2 can be attached to the base body 1 in such a manner that its bearing surface 19 comes to lie on the front surface 14, while the projection 17 engages in the groove 15 of the base body 1. In this position the cutting insert holder 2 can be adjusted in the radial direction, as illustrated in FIG. 7 by the double arrow. The measuring and/or registering marks 11, 12 (see FIG. 1) can be used for rough radial adjustment of the cutting insert holder 2 on the base body 1. To attach the cutting insert holder 2 on the base body 1 the screw 5 together with the disk spring 6 is then screwed through the bore 7 of the cutting insert holder 2 formed as a slotted hole into a corresponding tapped hole in the front surface 14 of the base body 1. Because the bore 7 is formed as a slotted hole, limited radial movement of the cutting insert holder 2 can take place with the screw 5 inserted. As can be seen in particular in FIGS. 1 and 7, the upper surface 20 of the cutting insert holder 2 has a recess or countersink 8, which surrounds the bore 7 formed as a slotted hole. This recess 8 is designed in such a manner that the disk spring 6 fits into the recess 8. Furthermore the recess 8 is dimensioned such that with disk spring 6 mounted on the screw 5 it is ensured that in no position of the screw 5 in the bore 7 formed as a slotted hole does the thread of the screw 5 strike against the inner surface of the bore 7. This is achieved owing to the fact that during radial adjustment of the cutting insert holder 2 within the groove 15, before the thread of the screw 5 can strike against the inner surface of the bore 7, the outer edge of the disk spring 6 is stopped by the inner wall of the recess 8. The screw 5 is advantageously protected against wear as a result of this arrangement.

After the cutting insert holder 2 has been roughly adjusted in the radial direction likewise with the aid of the positioning marks 11, 12, the screw 5 is tightened in such a manner that a specific retaining force is exerted on the cutting insert holder 2 via the disk spring 6. As a result it is ensured that a relative movement of the cutting insert holder 2 with respect to the base body 1 can only take place by application of force which exceeds the retaining force of the disk spring 6. For example the drilling tool in this position can be mounted in any situation, that is to say even overhead for example, without the risk of self-actuated relative movement between cutting insert holder 2 and base body 1 arising.

The adjusting screw 21, which is arranged within the bore 9 at least partly implemented as tapped hole, is used for fine radial adjustment. The bore 9 in the embodiment shown is radially arranged within the projection 17, so that, as can be seen in FIG. 1 for example, with cutting insert holder 2 attached the bore 9 lies within the groove 15. The transverse stud 18 shown in FIGS. 8 and 9, which is inserted in the body of the cutting insert holder 2 only after the screw 21 has been introduced into the bore 9 only serves to prevent the screw 21 inadvertently falling out of the bore 9. The bore 9 in the embodiment shown in FIGS. 7 to 9 opens inwards in the radial direction, that is to say in FIGS. 7 to 9 to the right, so that, with the screw 21 inserted in the bore 9, the tip of the screw 21 in the radial direction projects inwards out of the projection 17.

The interaction of the individual parts will become clear on the basis of FIGS. 10 to 15. FIG. 10 shows a side view onto the base body 1 with cutting insert holders 2 attached. FIGS. 11 and 12 in each case show sections along line B-B and/or C-C. FIG. 11 for example shows a section viewed from above onto the base body 1. To be clearly seen are the grooves 15, into which the projections 17 of the cutting insert holders 2 reach. The projections 17 are adapted to the internal contour of the groove 15 in such a manner that with cutting insert holder 2 attached essentially a movement of the cutting insert holder 2 with respect to the base body 1 is only possible in the radial direction. Clearly visible likewise is the adjusting pin 4 in the centre of the base body 1. FIG. 12 shows the cutaway view seen from bottom to top, complementary to FIG. 11, so that the lower bearing surface 19 of the cutting insert 2 can be seen. On the basis of FIGS. 11 and 12 the importance of the adjusting screws 21 is clear. That is to say if the adjusting screw 21 is turned inside the bore 9, the internal end of the adjusting screw 21 withdraws from the projection 17 towards the adjustment pin 4 and eventually comes into contact with said pin. The adjusting pin 4 thus forms a kind of counter bearing for the adjusting screws 21. Now if the adjusting screw 21 is turned further, the retaining force in the radial direction, applied by the screws 5 via the disk springs 6 on the cutting insert holder 2, is overcome, so that a relative movement of the cutting insert holder 2 with respect to the base body 1 arises. As a result of the radial arrangement of the screw 21 in the bore 9 running in the radial direction a force is specifically applied exclusively in the radial direction, so that a radial movement of the cutting insert holder 2 inside the grooves 15 arises. By turning the adjusting screw 21 the cutting insert holder 2 can be very precisely adjusted in the radial direction.

For clarification FIG. 13 shows a view from above onto the drilling tool with cutting insert holders 2 attached, and FIGS. 14 and 15 in each case show cutaway views along lines A-A and/or D-D.

For radial adjustment of the cutting insert holder 2 on the base body 1 therefore the cutting insert holder 2 is firstly attached to the base body 1 in such a manner that the projection 17 comes to lie in the groove 15. The screw 5 together with the disk spring 6 is inserted through the bore 7 of the cutting insert holder 2 formed as a slotted hole into a corresponding tapped hole in the bearing surface 14 of the base body 1. Here the disk spring 6 comes to lie in the recess 8, which surrounds the bore 7. The cutting inserts holder 2 can now be roughly adjusted and fixed by light tightening of the screw 5. At the same time it is to ensured that the cutting insert holder 2 does not lie in the radial direction too far outside, since as is again described below, with the aid of the adjusting screw 21 only radial re-adjustment of the cutting inserts 3, 3', 3" or of the cutting insert holders supporting these can take place outwards. After the individual cutting insert holders 2 have been fixed by light tightening of the screws 5 via the disk springs 6 with corresponding retaining force, fine adjustment is carried out with the aid of the adjusting screws 21, which as can be seen in FIG. 14 for example, are turned inwards inside the bore 9 in the radial direction, that is to say towards the adjusting pin 4, until they abut against the exterior surface of the adjusting pin 4. Now if the screw 21 is turned further, this leads in FIG. 14 to a radial movement of the cutting insert holder 2 downwards, so that the drilling diameter of the cutting insert 3 is increased.

For fine adjustment the adjusting pin 4 can not only serve as a counter bearing, but additionally provide a measuring point, as likewise indicated in FIG. 14. By measuring the distance a it is possible to check whether the cutting insert 3 is radially in the correct position and if necessary as a function of the measurement this can be corrected by turning the screw 21. This measurement can be carried out for example with a fixed or caliper gauge. Complex measurement with the aid of a so-called pre-adjusting device is unnecessary. This kind of measurement is particularly advantageous if an odd number of cutting insert holders 2 is used, since no diametrically facing cutting insert 3, 3', 3" is associated with each cutting insert holder 2 and/or each cutting insert 3.

After fine adjustment in the radial direction is completed with the aid of the fine adjusting screw 21, the screws 5 can be fully tightened so that during the cutting operation when the cutting inserts 3, 3', 3" engage with the work-piece there is no relative movement between the cutting insert holder 2 and the base body 1.

It goes without saying that the counter bearing and/or abutment point for the fine adjusting screws 21 do not necessarily have to be provided on the adjusting pin 4. In particular in the case of drilling tools with a very large diameter this therefore imposes a corresponding advance of the adjusting screw 21 before it engages the adjusting pin 4.

Figure 23:
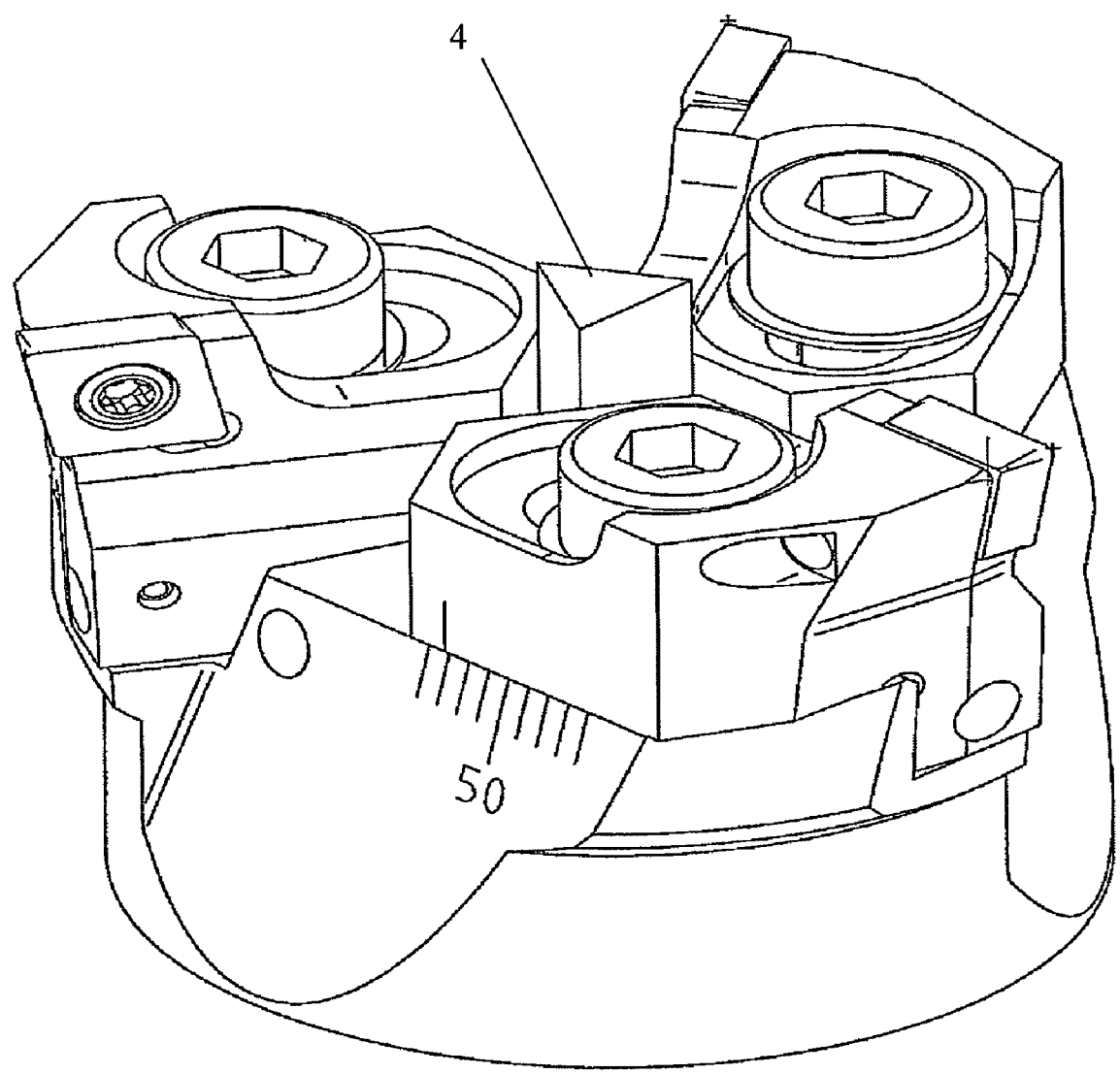
FIG. 23 shows a polygonal adjusting pin.

Also, as shown in FIG. 23, the adjusting pin 4 can have a cross section of a regular polygon with N angles, whereby N is the number of cutting insert holders, which can be on the base body.

At this stage it should be pointed out that the sections of the front surface 14, which are intended to accommodate the lower bearing surface 19 of the cutting insert holder 2 are slightly inclined with respect to the radial plane, in order to press the cutting insert holder against the side wall of the groove 15 and thus to define a clear mounting position during tightening of the locking screw 5. This can be seen particularly well in FIG. 15. The inclination of the sections of the front surfaces, serving as a mounting surface, on which the spacers 13 are also arranged, is preferably inclined by between 4 and 12° and particularly preferably by about 8° with respect to the radial plane.

Figure 17:
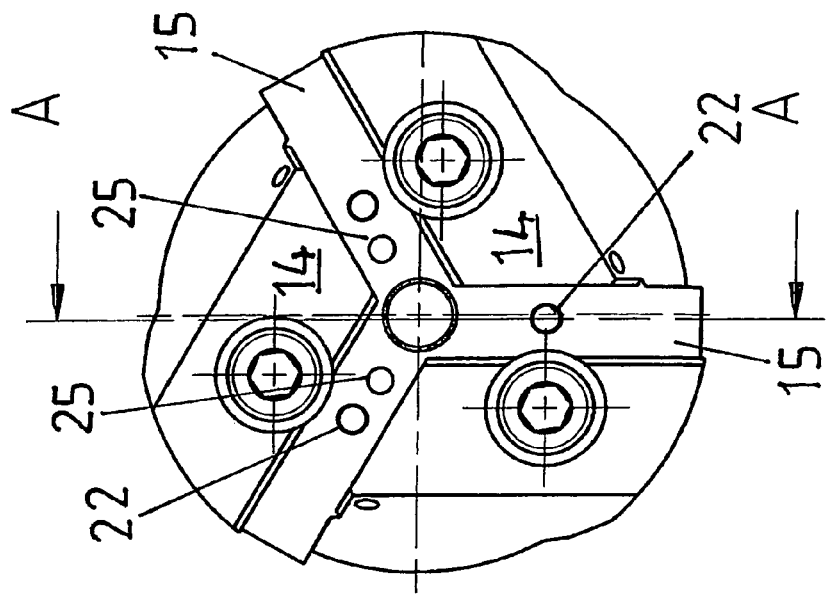
Figure 16:
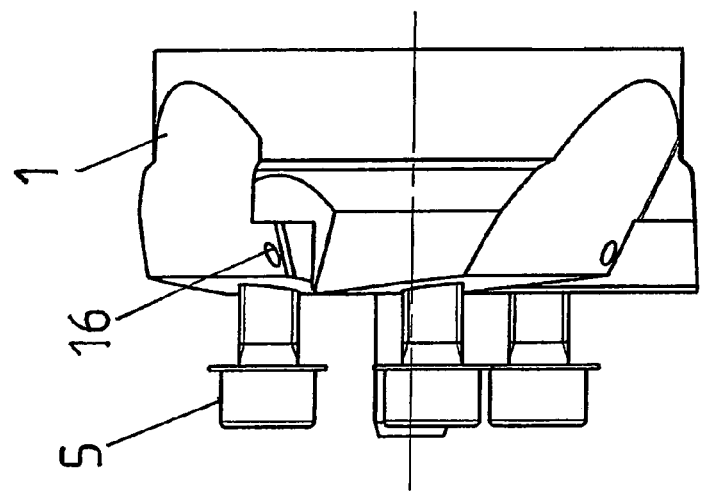
Figure 18:
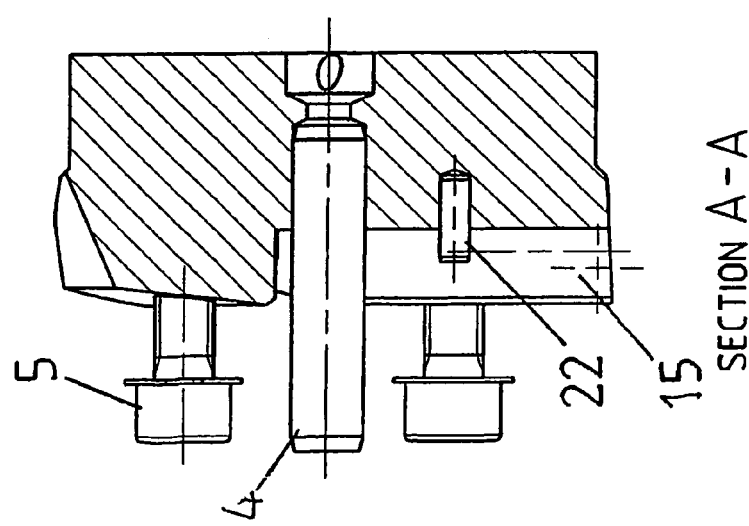

An alternative embodiment of the drilling tool according to the invention is shown therefore in FIGS. 16 to 21. In FIG. 16 a side view of the base body 1 without cutting insert holder 2 attached is illustrated. The adjusting pin 4 as well as the screws 5 with associated disk springs 6 can also be seen here. A plan view from above onto the base body 1 of the second embodiment can be seen in FIG. 17. It can be clearly seen that additional studs 22 are provided in the grooves 15. The studs 22 are arranged, as can be seen, amongst others in the cutaway view along line A-A of FIG. 17, which is shown in FIG. 18, at the bottom of the groove 15. These studs 22 form stop and/or counter bearing surfaces for the fine adjusting screw 21.

FIGS. 19 to 21 show a second embodiment of a cutting insert holder 2, which cooperates with the additional studs 22 of the second embodiment of the base body 1. It can be clearly seen in this embodiment (see for example FIG. 21) that the bore 9 does not extend in the radial direction through the entire projection 17, but ends in an oblong recess 23. The oblong recess 23 is formed in such a manner that when the cutting insert holder 2 is mounted on the base body 1 the stud 22 penetrates the recess 23. The fine radial adjustment of the cutting insert shown in FIGS. 19 to 21 is then carried out in such a manner that the fine adjusting screw 21 contacts the stud 22 and thus moves the cutting insert holder 2 in the radial direction with respect to the stud 22, so that the stud 22 is adjusted within the oblong recess 23.

Furthermore the recess 23 limits the radial adjustability of the cutting insert holder 2 in the radial direction, so that during the adjustment procedure the holder 2 is prevented from inadvertently sliding out of the groove 15.

Figure 22:
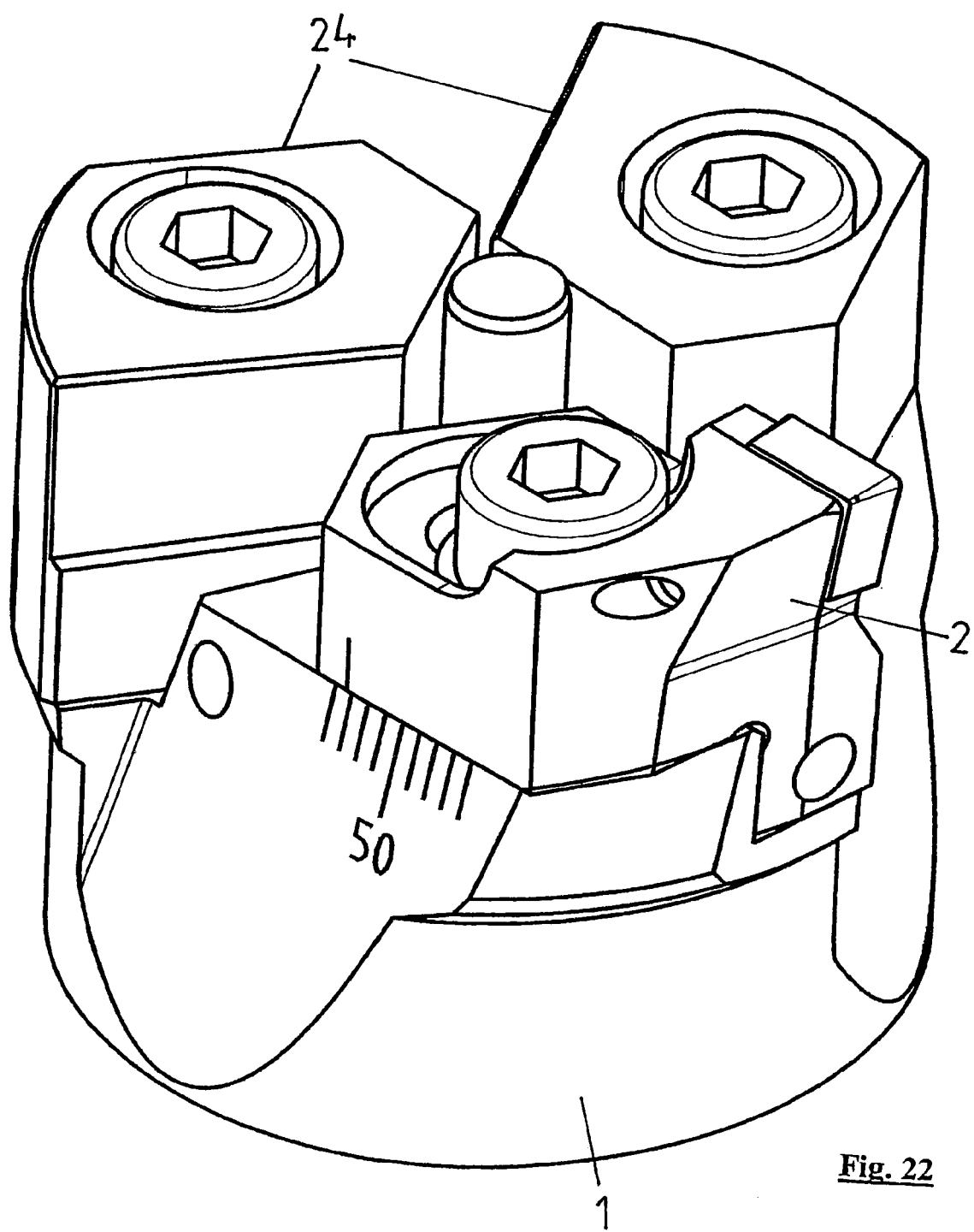

Finally a further possibility of using the drilling tool according to the invention is illustrated in FIG. 22. Here the tool is only equipped with a cutter and/or a cutting insert holder 2. In order to protect the grooves and support surfaces of the holders not equipped with cutting insert holders during the cutting operation, dummy parts 24 are inserted into the two free grooves. The dummy parts 24 are likewise secured to the base body with the aid of a locking screw. However the dummy parts shown in FIG. 22, do not have any longitudinal bore, so that the dummy parts 24 cannot be radially adjusted here.

The dummy parts 24 also have the function, apart from protecting the surfaces, of at least partially compensating the imbalance of the tool, which arises due to asymmetrical "loading" of the base body. For some applications it can be advantageous if the dummy parts are also adjustable in the radial direction, so that with the aid of the dummy parts 24 as good a balancing of the tool as possible can be achieved.

The dummy parts 24 in the embodiment shown on their support surface (not shown) have a stud extending in the axial direction. This stud with the dummy parts 24 attached penetrates the bores 25 located in the grooves, which are shown in FIGS. 4 and 17. The corresponding bores 25, as likewise illustrated in FIGS. 4 and 17, are only provided in two grooves. This arrangement ensures that the dummy parts are not screwed into the groove intended for the cutting insert holder 2. Thus the machine control system "knows" in which groove the cutting insert is located and can adapt the cutting program accordingly.

REFERENCE SYMBOL LIST 1 base body
2 cutting insert holder
3, 3', 3" cutting insert
4 adjusting pin
5 locking screw
6 disk springs
7 bore
8 recess
9 bore
11, 12 measuring or positioning marks
13, 13' spacers or shims
14 front surface
15 grooves
16 cooling agent supply pipe
17 projection
18 transverse stud
19 lower bearing surface
20 upper surface
21 adjusting screw
22 studs
23 oblong recess
24 dummy part
25 bore for dummy part
a distance/deviation

The invention claimed is:

1. Base body for a drilling tool, whose front surface region can accommodate at least one cutting insert holder, comprising at least one adjusting pin connected to the base body and axially overlapping the cutting insert holder and/or the cutting insert, wherein the cutting insert holder is radially adjustable with respect to the base body based on a radial deviation measured between a defined point of the cutting insert holder or the cutting insert accommodated on the cutting insert holder and the adjusting pin, wherein the adjusting pin is centrally aligned with the axis of rotation of the tool, wherein the adjusting pin protrudes axially past at least a portion of an upper surface of the cutting insert holder.

2. Base body according to claim 1, wherein a N number of cutting insert holders can be accommodated on the base body and N adjusting pins are provided, one of which is each associated with a cutting insert holder and/or a cutting insert.

3. Base body according to claim 1, comprising a mechanical measurement means to measure the radial deviation between the defined point of the cutting insert holder or the cutting insert accommodated on the cutting insert holder and the adjusting pin.

4. Base body according to claim 1, wherein the adjusting pin has a cylindrical form.

5. Base body according to claim 1, wherein the adjusting pin has the cross section of a regular polygon with N angles, whereby N is the number of cutting insert holders, which can be on the base body.

6. Base body according to claim 2, wherein N is an odd number.

7. Base body according to claim 1, wherein the front surface has at least one groove running in the radial direction, which groove is intended to accommodate a longitudinal projection of the cutting insert holder corresponding to the groove shape.

8. Base body according to claim 7, wherein the groove has an essentially U-shaped cross section.

9. Base body according to claim 7, wherein the groove bottom has at least one projection engaged in a recess in the cutting insert holder and limiting the radial adjustment of the cutting insert holder.

10. Base body according to claim 1, wherein a device for supporting a cutting insert holder on the front surface is provided with variable retaining force.

11. Base body according to claim 10, wherein the device for holding a cutting insert holder consists of a screw, which reaches through a longitudinal opening in the cutting insert holder and a spring.

12. Base body according to claim 1, wherein a device is provided for axial adjustment of the cutting insert holder.

13. Base body according to claim 12, wherein the device for the axial adjustment of the cutting insert holder consists of shims arranged between the cutting insert holder and a front surface of the base body.

14. Base body according to claim 1, wherein for each cutting insert holder a device is provided for the radial adjustment of the cutting insert holder.

15. A drilling tool, comprising a base body and a cutting insert holder, wherein the cutting insert holder includes a seat for receiving a cutting insert, wherein the base body includes a front surface region to accommodate at least one cutting insert holder, at least one adjusting pin connected to the base body and axially overlapping the cutting insert holder and/or the cutting insert positioned in the seat, wherein the cutting insert holder is radially adjustable with respect to the base body based on a radial deviation measured between a defined point of the cutting insert holder or the cutting insert positioned in the seat and the adjusting pin, wherein the adjusting pin is centrally aligned with the axis of rotation of the tool, wherein a bearing surface for supporting the cutting insert holder on the front surface of the base body of the drilling tool has a longitudinal projection overlapping the bearing surface for engaging in a groove arranged on the front surface, and wherein the adjusting pin protrudes axially past at least a portion of an upper surface of the cutting insert holder.

16. Drilling tool according to claim 15, wherein the cutting insert holder has a device for radial adjustment of the cutting insert holder with respect to the base body.

17. Drilling tool according to claim 16, wherein the device for radial adjustment of the cutting insert holder comprises a screw, which abuts against a stop element firmly connected to the base body.

18. Drilling tool according to claim 17, wherein the screw in the longitudinal direction runs through at least one part of the longitudinal projection.

19. Drilling tool according to claim 15, wherein the longitudinal projection has a recess, which is arranged in such a manner that a projection located on the groove bottom of the front surface of the drilling tool engages in the recess and limits the radial adjustment of the cutting insert holder in the groove in at least in one direction.

20. Drilling tool according to claim 19, wherein the projection has a tapped hole, which in the longitudinal direction opens into the recess.

21. Drilling tool according to claim 15, wherein a slotted hole is provided for attaching the holder to the base body by means of a screw extending through the slotted hole and engaging in a threaded hole on the base body.

22. Drilling tool according to claim 21, wherein on the side of the slotted hole facing away from the front surface a countersink is provided to seat a disk spring arranged between a screw head and a slotted hole.

23. Base body according to claim 1, with at least one cutting insert holder with a seat for receiving a cutting insert, wherein a bearing surface for supporting the cutting insert holder on the front surface of the base body has a longitudinal projection overlapping the bearing surface for engaging in a groove arranged on the front surface.

24. Base body according to claim 23, wherein three cutting insert holders are provided.

25. Base body according to claim 9, wherein the at least one projection is in the form of a stud.

26. Base body according to claim 11, wherein the spring is a disk spring.

* * * * *